(12) United States Patent
Shah et al.

(10) Patent No.: US 9,396,237 B1
(45) Date of Patent: Jul. 19, 2016

(54) MONITORING APPLICATIONS FOR INFRINGEMENT

(71) Applicant: Focus IP Inc., Boise, ID (US)

(72) Inventors: Faisal Shah, Boise, ID (US); Chris Bura, Pleasant Hill, CA (US)

(73) Assignee: Focus IP Inc., Boise, ID (US)

( * ) Notice: Subject to any disclaimer, the term of this patent is extended or adjusted under 35 U.S.C. 154(b) by 211 days.

(21) Appl. No.: 14/178,473

(22) Filed: Feb. 12, 2014

Related U.S. Application Data

(60) Provisional application No. 61/763,675, filed on Feb. 12, 2013, provisional application No. 61/881,279, filed on Sep. 23, 2013.

(51) Int. Cl.
*G06F 17/30* (2006.01)

(52) U.S. Cl.
CPC .................................. *G06F 17/3053* (2013.01)

(58) Field of Classification Search
CPC .............................. G06F 17/30; G06F 17/3053
See application file for complete search history.

(56) References Cited

U.S. PATENT DOCUMENTS

| | | | | |
|---|---|---|---|---|
| 6,401,118 B1* | 6/2002 | Thomas | ................... | G06F 21/10 707/999.004 |
| 7,346,605 B1* | 3/2008 | Hepworth | .............. | G06Q 10/00 707/999.003 |
| 8,010,511 B2* | 8/2011 | Brock | ..................... | G06F 21/10 707/694 |
| 2002/0174132 A1* | 11/2002 | Silverman | ......... | G06F 17/30864 707/999.107 |
| 2008/0046412 A1* | 2/2008 | Lee | ........................ | G06Q 10/10 707/999.003 |
| 2008/0065611 A1* | 3/2008 | Hepworth | ......... | G06F 17/30864 707/999.003 |
| 2012/0240236 A1* | 9/2012 | Wyatt | .................... | G06F 21/564 726/25 |
| 2013/0347094 A1* | 12/2013 | Bettini | ................ | H04L 63/0245 726/11 |

* cited by examiner

*Primary Examiner* — Khanh Pham
(74) *Attorney, Agent, or Firm* — Swanson & Bratschun, L.L.C.

(57) ABSTRACT

Novel tools and techniques for monitoring software applications, and in particular software applications available from app stores, for apps that might infringe the intellectual property of others. Merely by way of example, a tool might identify an application in an app store, download that application, and analyze that application for content that might be infringing. Such analysis can include, but is not limited to, decompiling the application. Meta-content about the application (including portions of the content) can be compared with meta-content about other applications, to identify associations between applications. In other cases, the meta-content can be used to identify acts of intellectual property infringement.

24 Claims, 11 Drawing Sheets

| Track/Alerts | BrandTrack | Reported Apps | Search History | | | |
|---|---|---|---|---|---|---|
| ☐ Select All | Action ▼ | Add Brand | | | | |

1 -- 9 of 9     10 ▼

| | Brand | Last Hit Found | Last Added | Total Added | Reviewed | |
|---|---|---|---|---|---|---|
| ☐ | BRAND X | 12/25/2012 | 1 | 26 | Details | ⊖ |
| ☐ | BRAND Y | 12/30/2012 | 1 | 872 | Details | ⊖ |
| ☐ | BRAND Z | 12/24/2012 | 1 | 174 | Details | ⊖ |
| ☐ | BRAND A | 12/22/2012 | 2 | 2 | Details | ⟩ |
| ☐ | BRAND B | 12/29/2012 | 1 | 385 | Details | ⟩ |
| ☐ | BRAND C | 12/26/2012 | 1 | 494 | Details | ⊖ |
| ☐ | BRAND D | 12/26/2012 | 1 | 227 | Details | ⟩ |
| ☐ | BRAND E | 12/28/2012 | 1 | 1145 | Details | ⟩ |
| ☐ | BRAND F | 12/22/2012 | 103 | 103 | Details | ⟩ |

| Users | Brand Points |

| | |
|---|---|
| 2500 | Brand is Title |
| 1000 | Brand in the Title |
| 2500 | Brand is Publisher |
| 1500 | Brand in the Publisher |
| 50 | Brand in Description |
| 100 | Paid App |
| 0 | Free App |
| 1400 | Brand in the Domain Name of URL |
| 500 | Brand in the Path of URL |
| 3000 | Critical |
| 2000 | High |
| 1000 | Medium |
| 0 | Low |

Save

| Track/Alerts | BrandTrack | Reported Apps | Search History | | | | |
|---|---|---|---|---|---|---|---|

Brand Track detail: BRAND X                                           View Past Alerts [Show All ▼]

☐ Ignored    ⊘ Critical    ☑ ▲ High Priority    ☑ △ Medium Priority    ☑ △ Low Priority

[Print]

◀ 1 -- 50 of 1140                                                                          [50 ▼]

| App Title | Publisher | Store | Category | Price | First Found | Risk Level | Tracking |
|---|---|---|---|---|---|---|---|
| JOYSOUND XXX | XXX | Google Play | Music & Audio | 0.00 | 12/28/2012 | △ | |
| BRAND X Backgrounds | ABC Codex | Windows | Photo | 1.99 | 12/28/2012 | △ | |
| 3D XXXXXX | ACME CORPORATION | Google Play | Cards & Casino | 0.00 | 12/27/2012 | △ | |
| 3D XXXXX | ACME CORPORATION | Google Play | Cards & Casino | 6.16 | 12/27/2012 | △ | |
| Phone Numbers -- BRAND X | Smith Software | iTunes | Travel | 0.00 | 12/26/2012 | △ | |
| Hidden Objects: Smith and Jones | BRAND X | iTunes | Games | 0.00 | 12/26/2012 | △ | |
| Toy Tale | Gaming Inc | iTunes | Games | 14.99 | 12/25/2012 | △ | |
| Televisão do Brasil | Miguel Rodriguez | iTunes | Utilities | 1.99 | 12/25/2012 | △ | |
| XXX for XXX | XXX | Google Play | Brain & Puzzle | 4.31 | 12/24/2012 | △ | |
| Bob Lifestyle | SW Labs S.L. | Windows | Lifestyle | 0.00 | 12/24/2012 | △ | |
| Capturing Magic -- BRAND X Version | The Dish | iTunes | Travel | 3.99 | 12/24/2012 | △ | |
| Where am I? Free | BRAND X | iTunes | Games | 0.00 | 12/23/2012 | ▲ | |

| Track/Alerts | BrandTrack | Reported Apps | Search History |

Apps Publishers

☐ Select All   Action ▼

| App Link | App Title | Tracking Date | Last Alert Date | Number of Alerts | Refresh |
|---|---|---|---|---|---|
| ☐ WAR OF SOLDIERS | War of Soldiers | 12/28/2012 | | 0 | |
| ☐ [icon] | Slingshot Birds | 12/28/2012 | | 0 | |
| ☐ SW X | Full Course for Software X | 12/28/2012 | | 0 | |
| ☐ ICON [icon] | ICON: The Complete Story | 12/28/2012 | 2012-12-18 11:33:36 | 1 | |

MONITORING APPLICATIONS FOR INFRINGEMENT

CROSS REFERENCE TO RELATED APPLICATIONS

This application claims the benefit, under 35 U.S.C. §119(e), of provisional U.S. Patent Application No. 61/763,675, titled "Monitoring of App Stores," and filed Feb. 12, 2013 by Shah et al., and the benefit under 35 U.S.C. §119(e), of U.S. Patent Application No. 61/881,279, titled "Monitoring Applications for Infringement," and filed Sep. 23, 2013 by Shah et al., the entire disclosure of each of which is incorporated herein by reference for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND

Individual software programs, commonly known as "apps" (especially in the mobile device context, but in the context of other computing platforms) are often made available through "App Stores," and such apps represent new phenomenon in computing. This new publishing and marketing model presents a new set of challenges for intellectual property stakeholders. Prior to this phenomenon, most intellectual property was discovered and monitored via standard online and offline media sources. On the other hand, App Stores, although online, contain millions of apps, each with their own set of content, much of which is undiscoverable via standard online searches. Compounding the intellectual property challenge is the immense popularity of apps and the volume of new apps becoming available. Thus, creating a system that specifically monitors apps via App Stores becomes an important tool for the intellectual property community.

BRIEF SUMMARY

Certain embodiments provide solutions for monitoring app stores, and in particular for monitoring app stores for apps that might infringe the intellectual property of others. Merely by way of example, some embodiments might crawl app stores (such as the Apple's App Store™, the Amazon Appstore for Android™, and/or any other central repository that sells, offers for download, or otherwise distributes software applications, including without limitation mobile apps, desktop applications, and/or the like) to identify software applications and track meta-content (e.g., publisher information, version information, description, ratings, reviews, and/or the like) about those applications. In other embodiments, meta-content can be collected through analysis of the application itself, for instance, by decompiling the application and searching the decompiled code and resources for terms of interest, which can serve as additional meta-content for further analysis.

This meta-content can be sorted and/or searched to allow detection of infringing material (such as misuse of another party's trademark, copyrighted content, and/or the like). Using systems provided by various embodiments, for example, a trademark holder can quickly and easily monitor an entire app store for new or updated applications that might misuse the holder's trademark.

The tools provided by various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible and/or non-transitory computer readable media (such as, to name but a few examples, optical media, magnetic media, and/or the like).

Merely by way of example, a method in accordance with one set of embodiments might comprise maintaining a database comprising existing meta-content about one or more software applications. In one aspect, the database might comprise a plurality of records, including a record for each of the one or more software applications. The method might further comprise analyzing, with a first computer, a software application to collect meta-content about the software application and/or storing the meta-content about the software application in the database.

In some cases, the method might further comprise creating, with a second computer, one or more trigger rules pertaining to a term of interest. (In some cases, the first computer and the second computer might be the same computer.) The method can also include determining, with the second computer, weighting factors for one or more of the trigger rules; in an aspect, the ranking factors might represent a relative importance of different characteristics of the meta-content. The method, then, can comprise searching the database with the second computer to identify a result set comprising one or more records that satisfy at least one of the one or more trigger rules and/or analyzing, with the second computer, the result set with the weighting factors to prioritize the plurality of records in the result set.

In a particular embodiment, the method can include notifying a user about the result set; providing, with the second computer, a user interface for interacting with the user; and/or displaying, with the user interface, at least some of the records in the result set, based at least in part on analysis of the result set with the weighted ranking.

An apparatus provided by other embodiments might comprise one or more non-transitory computer readable media collectively having encoded thereon a set of instructions executable by one or more computers to perform one or more operations, including without limitation operations in accordance with methods provided by other embodiments. Merely by way of example, in one embodiment, the set of instructions might comprise instructions to maintain a database comprising existing meta-content about one or more software applications, the database comprising a plurality of records, including a record for each of the one or more software applications; instructions to analyze a software application to collect meta-content about the software application; instructions to store the meta-content about the software application in the database; instructions to create one or more trigger rules pertaining to a term of interest; instructions to determine weighting factors for one or more of the trigger rules, the ranking factors representing a relative importance of different characteristics of the meta-content; instructions to search the database to identify a result set comprising one or more records that satisfy at least one of the one or more trigger rules; instructions to analyze the result set with the weighting factors to prioritize the plurality of records in the result set; instructions to notify a user about the result set; instructions to provide a user interface for interacting with the user; and/or instructions to display at least some of the records in the result set, based at least in part on analysis of the result set with the weighted ranking.

A computer system in accordance with another set of embodiments might comprise one or more processors (e.g., one computer with one or more processors, a plurality of computers each with one or more processor, and/or the like), and one or more non-transitory computer readable media in communication with the one or more processors, the one or more computer readable media collectively having encoded thereon a set of instructions executable by the computer system to perform one or more operations. The set of instructions might include, merely by way of example, instructions such as those described above.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIGS. 2-7 are exemplary screen diagrams illustrating features of various embodiments.

DETAILED DESCRIPTION OF CERTAIN EMBODIMENTS

While various aspects and features of certain embodiments have been summarized above, the following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments provide tools and techniques, including without limitation, systems, methods, and apparatus, that can help users identify misuse of brands, trademarks, and the like in software distributed through online stores (such as the App Store™ provided by Apple Computer. Many of these tools and techniques can be provided individually or as a combination of features. For example, some embodiments will monitor an app store and collect data about some or all of the applications on the store. This data can be collected by various techniques, and the data can be used to provide a user with information about use (and, specifically, misuse) of brands in which the user has an interest. Thus, for example, the system could be used by a brand owner to discover any misuses of the brand, to allow the brand owner to combat trademark infringement, correct any diluting uses even by licensed users, and the like.

Figure 1:
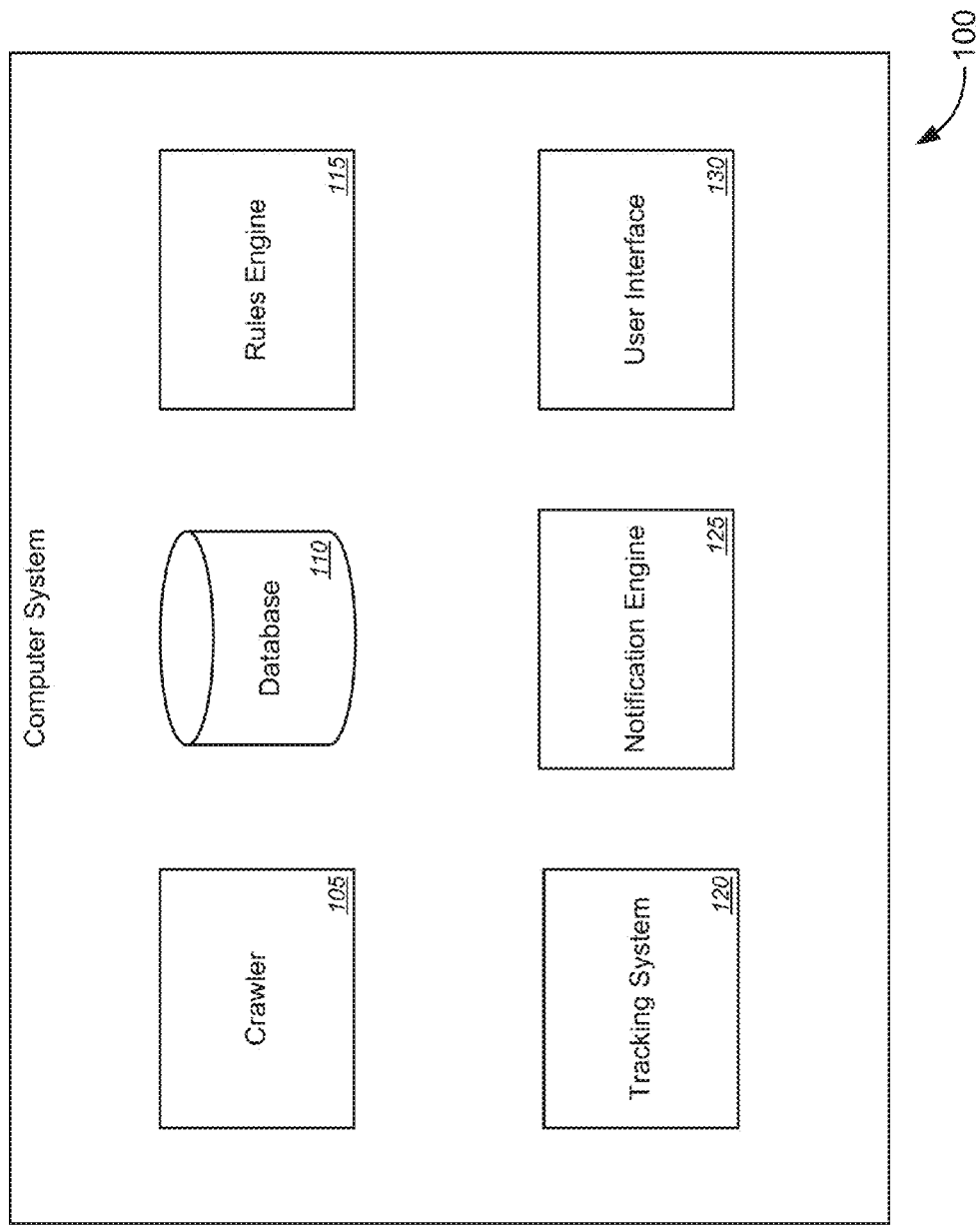
FIG. 1 is a block diagram illustrating functional components of a computer system in accordance with one set of embodiments.

In one set of embodiments, such features can be provided by a computer system, such as the computer system 100 of FIG. 1, which is depicted functionally to illustrate various functional components the computer system 100 might include. The computer system 100 might include one or more computers, each of which can have an appropriate architecture, one non-limiting example of which is described below with respect to FIG. 10, and the functional components illustrated on FIG. 1 can be divided among such computers variously according to different embodiments. Each component might be, for example, a software program, a function within a larger program, a server (or service provided by a server), an applet, and/or the like.

For example, in some embodiments, the computer system 100 can include a crawler component 105. The crawler component can function, in some aspects, like an automated browser that browses an app store much like a user would and downloads meta-content about software applications, and/or the software applications themselves. The nature of the crawler, and many cases, will depend on the interface provided by the app store. For example, if the app store provides a web interface, the crawler may comprise an HTML parser and an HTTP interface, much like a web browser, with customized instructions to automate the process of browsing the app store. In other cases, if the app store offers particular interface (such as an API), the crawler can include methods that call functions of the API to obtain information. In particular cases, if the app store requires the use of a dedicated client application, the crawler can be written to integrate with and/or communicate through the client application.

In some embodiments, the computer system 100 further includes a database 110, which can be used to store information about software applications, including without limitation software applications and/or information (such as meta-content) about those applications obtain and/or discovered through operation of the crawler 105. In one aspect, for example, the database might include a record for every software application that has been investigated by the crawler 105 (or another source). The record can include, in some embodiments, the application itself (e.g., source code, object code, byte code, and/or the like) and/or meta-content available from the app store. Such information can include any information obtained by the techniques described below, including without limitation information such as the following: identifiers used by the app store to identify the application; dates of creation, posting to the app store, updates; biographical information about an author and/or publisher of the application; pricing information; an identifier of an app store on which the application can be found; a reference (e.g., a URL) to a location of the application on an app store; and/or the like. The record might include fields to hold each type of meta-content in your field to hold the application. In some cases, the record might include historical information, such that when meta-content (or the application itself) is updated on an app store, the previous information is retained in the record (and/or another, linked record) when the record is updated with current information.

The database 110 might also store information about users (e.g., customers of the service). Such information can include, without limitation, contact information for a user, brands or other trademarks or names of interest to the user, trigger rules (which are described in further detail below), and/or the like.

The arrangement of the database 110 is discretionary. For example, in some cases, different databases might be used to hold information about applications and users, respectively. In other cases different tables in the same database might be used. Based on the disclosure herein, the skilled reader to appreciate that a number of different database arrangements can be employed in accordance with different embodiments, and that the arrangement of the database(s) may be implementation-specific.

In certain embodiments, the system 100 can include a rules engine 115, which processes trigger rules to filter applications in order to identify applications of interest to a user. Typically, a software application will be of interest to a user if it uses a brand in a way that the user has identified as being possible misuse. As described in further detail below, the rules engine 115 provides a robust mechanism to identify brand uses in applications (and/or meta-content) in a fashion that is customized to each user's particular concerns.

As illustrated, the computer system 100 of FIG. 1 also includes a tracking system 120. The tracking system 120 is a component that can provide tracking alerts, as described in further detail below. Merely by way of example, the tracking system 120 can issue a tracking alert when data in the database 110 indicates that a software application (and/or the application's content) has changed (or has been added, etc.) in an app store. The notification engine 125 is a component of the system 100 that can distribute such alerts (or other information) to users, using a variety of notification techniques, for example, as described in detail below. Thus, in some aspects, the notification engine 125 might comprise a number of communication interface, such as an SMTP server (or an interface to an external SMTP server), an SMS gateway (or an interface to an external SMS gateway), and interactive voice response unit (IVR) (or an interface to an external IVR), and/or the like.

As shown in FIG. 1, the computer system 100 also can provide a user interface 130, which can allow a user to interact with the system (for example, to view suspicious applications and their meta-content, etc.). As described in further detail below, the user interface can be provided in a number of different ways, and in a particular aspect, the user interface can be a graphical user interface (provided through a client application, web browser, etc.) that provides user interface screens (such as those depicted in FIGS. 2-7, described in further detail below) to provide information to the user and/or to receive information from the user. To provide the user interface, the system 100 might include, or be in communication with, one or more server applications, such as a web server, dedicated server application with an interface for a dedicated client application, and/or the like.

Features Provided by Various Embodiments

Different embodiments can provide a number of different features, and these features can be employed in many different combinations in accordance with various embodiments. Some such embodiments are described in the context of the AppDetex system, which can support an intellectual-property monitoring service for monitoring, inter alia, app stores for potential intellectual property infringement. Some features that can be provided by various embodiments of the AppDetex system include the following, and those features and services can be combined in different ways according to various embodiments:

BrandTrack Service

BrandTrack is a service that notifies users of the existence of current and new apps from various app stores that meet certain criteria, ranks them from high to low priority, and provides several types of management functionality. The following operations and technologies can be used to implement an exemplary BrandTrack service:

Trigger Rules—To setup the service the user or system creates "Trigger Rules," which can be considered an open-ended set of criteria that can apply to a) an app's meta-content (e.g., any content associated with an app from an app store where the app is made available) b) an app's actual code (in the form of raw source code, byte code, and/or executable binary code) and/or c) Third Party Content (e.g., any content associated with an app from outside an app store, such as the app's own website, reviews, Terms of Service, License Agreements, etc.) and can be used to scan such information for matches. A trigger rule may be as simple as a single text string such as "BRAND X" to be found in the title of an App or phrase such as "Just Do it" to be found in the description of an app. Other refinements may be a specific price or range of prices, an aspect of the app URL, or the existence of data from third party sources such as websites or the USPTO. Multiple triggers can be combined to create a very specific BrandTrack. As an example, an entertainment company named BRAND X may want to know the following: "Are there any apps that use the brand 'BRAND X' that are not associated with travel and leisure and that do cost money?" A Trigger Rule for this might be the following: (a) Find all apps with "BRAND X" in title, description, or publisher; (B) Cross check those apps with keywords of "travel," "photo," or "vacation" and remove these results; (C) Of the remainder, cross check for pricing greater than free. In the BrandTrack user interface, the user can define watches for different brands, trademarks, or other terms of interest (as shown in FIG. 2) and create trigger rules for each defined watch.

Weighted Ranking—In some embodiments, the system employs a weighted ranking system to determine the relative importance of different meta-content (or third party content) characteristics. For example, some users might place relatively more importance on the use of a term of interest (e.g., a trademark owned by the user) in the title of an app, while another user might place more importance on the use of a term of interest in the publisher's name, the app description, and/or the like. Hence, to provide a weighted ranking, the user and/or the system can associate the occurrence of various Trigger Rule matches and other matches with weighting factors, such as a point system, which may or may not be combined with other systematized algorithms. These weighting factors can then be used to determine rankings of search results, categories of search results, and/or the like. For example, the system might be configured to notify a user and/or display results only if those results are above a certain threshold (as determined by the weighting factors) and/or might notify the user of any matching search results but display all of the results in ranked order. FIG. 2 illustrates an example of a user interface screen 200 for assigning relative weighting factors to different meta-content characteristics.

Database search—The system then can search the database to identify applications that match the trigger rules (which can be considered search criteria). In an aspect, the database might store a record associated with each application, and the record might include different fields for each type of meta-content. In some cases, the database might categorize applications in a number of ways, such as applications that are current (i.e., applications currently available on one or more app stores), unavailable (i.e., applications which were once available but are no longer available), updated (i.e., applications for which at least some meta-content has been updated in a particular window of time), new (i.e., applications that have first appeared on an app store in a particular window of time), and/or the like. Applications might be categorized in multiple categories, such as current and updated. This database might be stored locally to the AppDetex system, or it might be remote from the system.

Notification Engine—Upon obtaining search results (e.g., one or more records that match the trigger rules and/or satisfy any weighted ranking conditions), the system might employ a notification engine to notify the user. The notification engine can support many different types of notifications, including but not limited to e-mail, SMS, inclusion in an interactive report provided in a user interface, and/or the like. The user can customize notification settings in the user interface to configure, for example, circumstances under which different types of notification should be provided (e.g., SMS notification for high-priority search results, inclusion in an interactive report for all search results), such that the user can review some results periodically or when the user decides to review them, while the user is notified of other results immediately.

User Interface—In some embodiments, the system provides a user interface (examples of which are described below) to interact with the user. Through this user interface, the user has the ability to review interactive reports (an example of which is provided on the user interface screen 400 illustrated by FIG. 4) and perform various management functions on the apps discovered through a BrandTrack. The user can also select a particular application to view detailed information on the application in the user interface and/or perform management functions, as illustrated by the user interface screen 500 of FIG. 5. The user can sort the search results in a report by various columns such as priority, date discovered, they can Track them, Report them, access the application in the app store, and perform other management functions. The user may also elect to "Ignore" an app or a publisher, which in affect hides the app from view. This is important as some apps that app may in fact be owned by the user's company or otherwise benign, allowing the user to reduce the number of apps in the list and better focus on apps needing enforcement.

Tracking Alerts Service

The system can also provide a tracking alerts service, which allows a user to select any number of apps from an app store via the interface and be notified when any change occurs to the meta-content of one of the apps. Such changes can include, but are not limited to, textual changes to title, description, publisher, administrative changes such as price, changes to ranking, URL changes, and/or the like. When a change occurs, the system provides a "before and after" view of the change to the user. In one aspect, the system can record every change it detects in an app so that full historical records can be analyzed.

Tracking setup—The system can receive user input indicating an application (or set of applications) to be tracked. This input can be provided from many different parts of the user interface, such as application search results, BrandTrack results, and/or the like, for example, by providing a "Track App" button in the interface.

Identifying changes—In some aspects, the system can include a Crawler that runs periodically (e.g., nightly or on any other appropriate frequency) to scan an app store for new or updated applications and meta-content. For instance, in some embodiments, each night (or other time) when the Crawler runs, as it comes upon an application that is being tracked, the Crawler it interrogates every field of that application's meta-content on the app store for differences. If there are no differences, nothing is done. If the Crawler does encounter any difference, such as a new version, a price change, addition to the description, a re-wording of any kind, etc., the Crawler saves particular information in the database, so that notifications and user interface information may be created. Alternatively and/or additionally, changes to a tracked application can be identified from an "updated" status in the database as a result of normal crawling operations, and/or the crawler might be deployed to obtain and save additional information in the database (in the same manner).

Notification of changes—the notification engine can provide notifications of changes in tracked applications using any of the techniques described above, including proactive notifications (such as email or SMS) and/or passive notifications (e.g., updating an interactive report in a user interface).

User interface—Similarly, a user can access the user interface to see a list of tracked applications (as shown on the screen 600 in FIG. 6) and can select a particular application to see a detailed report on the application (as shown by the user interface screen 700 in FIG. 6) or to take other actions. The system can be configured to highlight the changes in the meta-content (as shown on the user interface screen 700 of FIG. 7).

Figure 7:
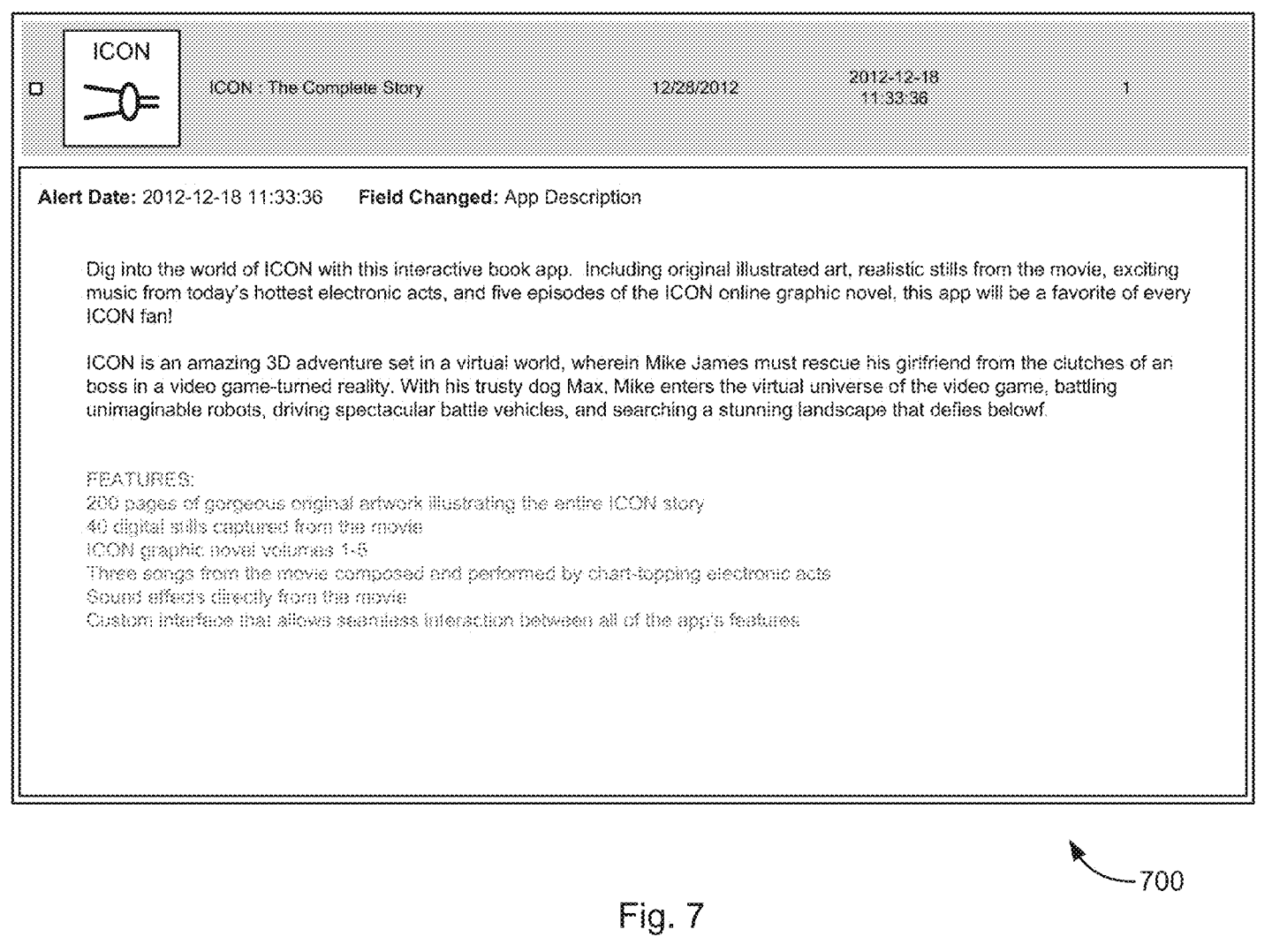

Tracking of publishers—in addition to tracking individual applications, the system can be configured to track some or all applications associated with a particular publisher, author, or the like, as shown in FIG. 7. This type of tracking, in an aspect, can be set from any suitable portion of the user interface, such as search results, BrandTrack results, etc., e.g., by simply clicking a "Track Publisher" button. The process for tracking a publisher, etc., is then similar to the general tracking process described above, but applies to some or all of the applications associated with that entity, instead of a single application. For example, in some embodiments, each night when the crawler runs, as it comes upon an app associated with a tracked publisher, it checks to see if the app is new or already in the system. It also checks for apps that were previously associated with the publisher that no longer exist in one of the stores. If it does encounter any difference such as an added or removed app, then it saves this information in the database so that notifications and UI information may be created.

EXEMPLARY EMBODIMENTS

A method 800 in accordance with one set of embodiments might comprise maintaining a database comprising meta-content about one or more software applications (block 805). Such software applications could be mobile apps, desktop applications, and/or the like. In one aspect, the database might comprise a record associated with each of the one or more software applications. In an embodiment, the method 800 might further comprise crawling, with computer, an app store (e.g., the Apple App Store™ etc.) to collect current meta-content about a plurality of software applications (block 810). This meta-content can include any information that is available from the app store with regard to each particular application. Different techniques can be used for crawling different app stores (e.g., web scraping techniques, APIs provided by the app stores, etc.), and information about a plurality of app stores might be stored in the same database or different databases.

Figure 9:
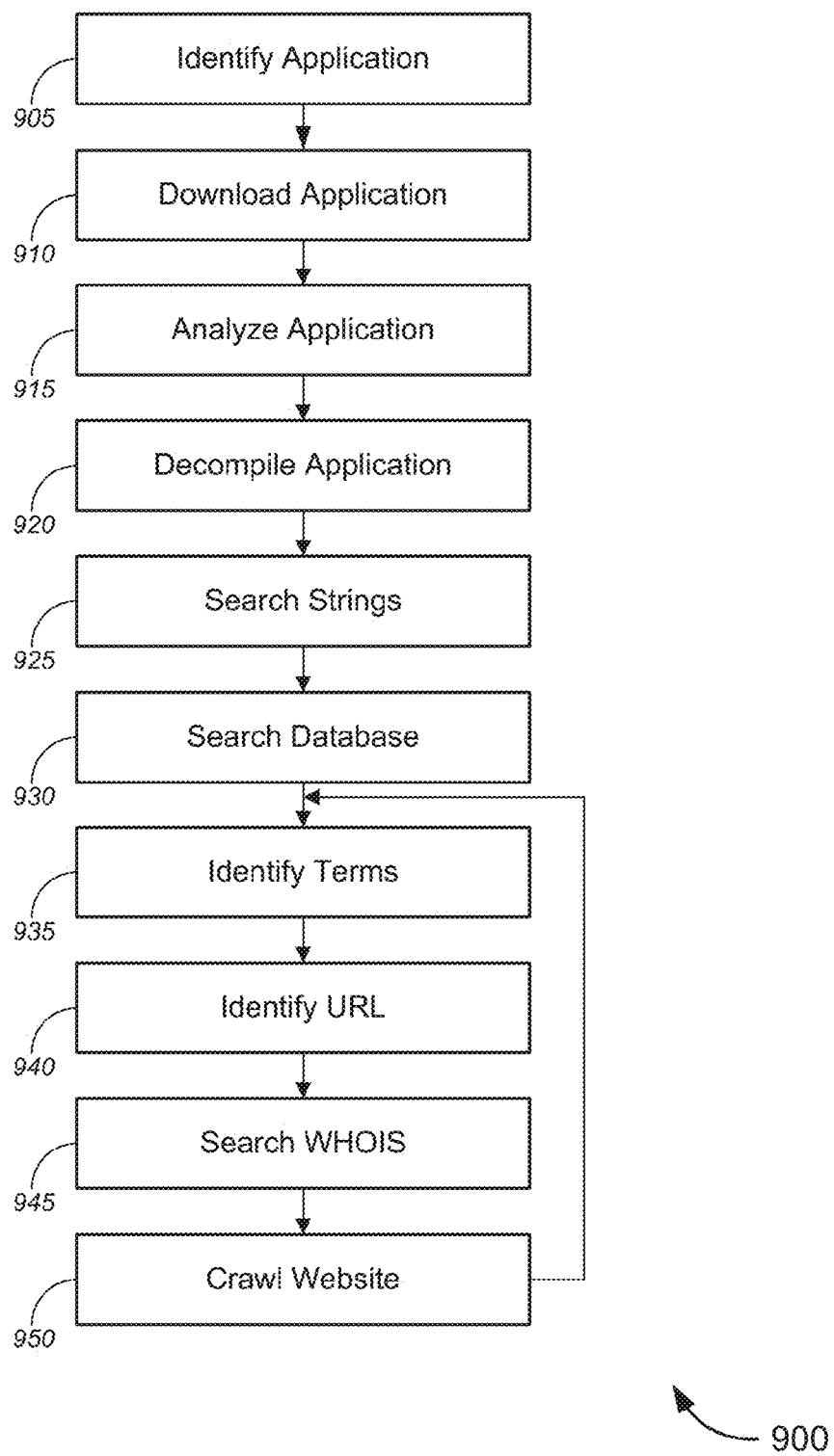
FIG. 9 is a process flow diagram illustrating a method of analyzing a software application, in accordance with one set of embodiments.

Meta-content can also include some or all of the content of an application itself. For example, FIG. 9 illustrates a method 900 of analyzing an application itself for additional meta-content. The method 900 comprises identifying an application to be analyzed (block 905). A number of techniques can be used to identify such an application, including, for instance, analysis of the meta-content available on the app store (as described elsewhere herein). Such analysis might identify a particular application as being related to another application that has been problematic in the past. Alternatively, identification of an application might include receiving user input identifying an application for analysis (such as choosing an application from an app store or from a list of applications).

The method 900 can further include analyzing the identified application to collect meta-content about the application (block 910). This meta-content might be additional to meta-content available from the app store, and it can include, for example, content from the application itself. Such information can include text strings, such as trademarks, copyrighted material, URLs, electronic mail addresses, top level domains ("TLD"), information identifying the source of the application, binaries or other resource, such as image files, audio files, and/or the like. Different techniques can be used to analyze a software application. Merely by way of example, in some cases, the application can be executed in a number of different ways. For instance, the application might be executed in an emulator on a computer system (e.g., in the case of mobile apps), might be executed on a mobile device, may be executed automatically by the system and/or manually by a user, and/or the like. Execution of the application can reveal content that might be appropriate for tracking as meta-content.

In other cases, analyzing the application can comprise decompiling the application (block 920). A number of tools can be used to decompile an application, many of which are familiar to those skilled in the art. It should be appreciated that the appropriate tool might depend on the nature of the application to be analyzed. At block 925, the decompiled code of the application can be analyzed and/or searched in different ways to determine the presence of content, such as text strings, that might be appropriate to save in the system's database as meta-content. Alternatively and are additionally, the decompiled code can be examined with a search utility, such as SOLR, and/or other search tools available in the art.

One skilled in the art will appreciate that an application might comprise a variety of application resources, which can include decompiled code, images, databases, sound files, and/or variety of other multimedia resources. Such application resources can be searched and/or analyzed as well, using any appropriate tools. Merely by way of example, if the application is designed to store data in a database, the system might analyze or search the database for any text strings of interest, which can be saved as meta-content (block 930). Other resources also can be saved as meta-content and/or analyzed. For example, image files within the decompiled application might be saved as images within the system's database, and/or such images might be analyzed to identify any text or other components within the images; such text can be saved as a text string in the meta-content database.

At block 935, the method 900 can comprise identifying any terms of interest (e.g., text strings of interest) within the meta-content. As noted above, such terms of interest can include, without limitation, information identifying a developer and/or distributor of the application, trademarks, copyrighted material, URLs, email addresses, TLDs (e.g., global TLDs known to be favored by sites that host pirated materials and the like), hostnames, IP addresses, and/or the like. A variety of search techniques can be used to identify such terms; for example, pattern matching can be used to identify URLs, string searching and/or root matching can be used to find trademarks, and/or the like.

If the analysis of an application identifies a URL (block 940), the method 900 can further comprise analysis of information relating to the URL. For example, the method 900 might comprise obtaining public information about a domain associated with the URL (such as WHOIS information, IP block information, and/or the like); hence the method might include searching WHOIS records of a domain referenced by the URL (block 945). In other cases, the method 900 might comprise navigating to a resource (such as a web site or web page) referenced by that URL (block 950). Some or all of the content available from such a resource (such as web page HTML code, images, etc.) can be obtained and analyzed (e.g., as described above) to identify additional terms of interest, and such terms (and/or the content itself) can be saved as meta-content in the database. In some cases, such content might include URLs to other resources, which can be investigated in recursive fashion, as indicated by the arrow on FIG. 9.

Figure 8:
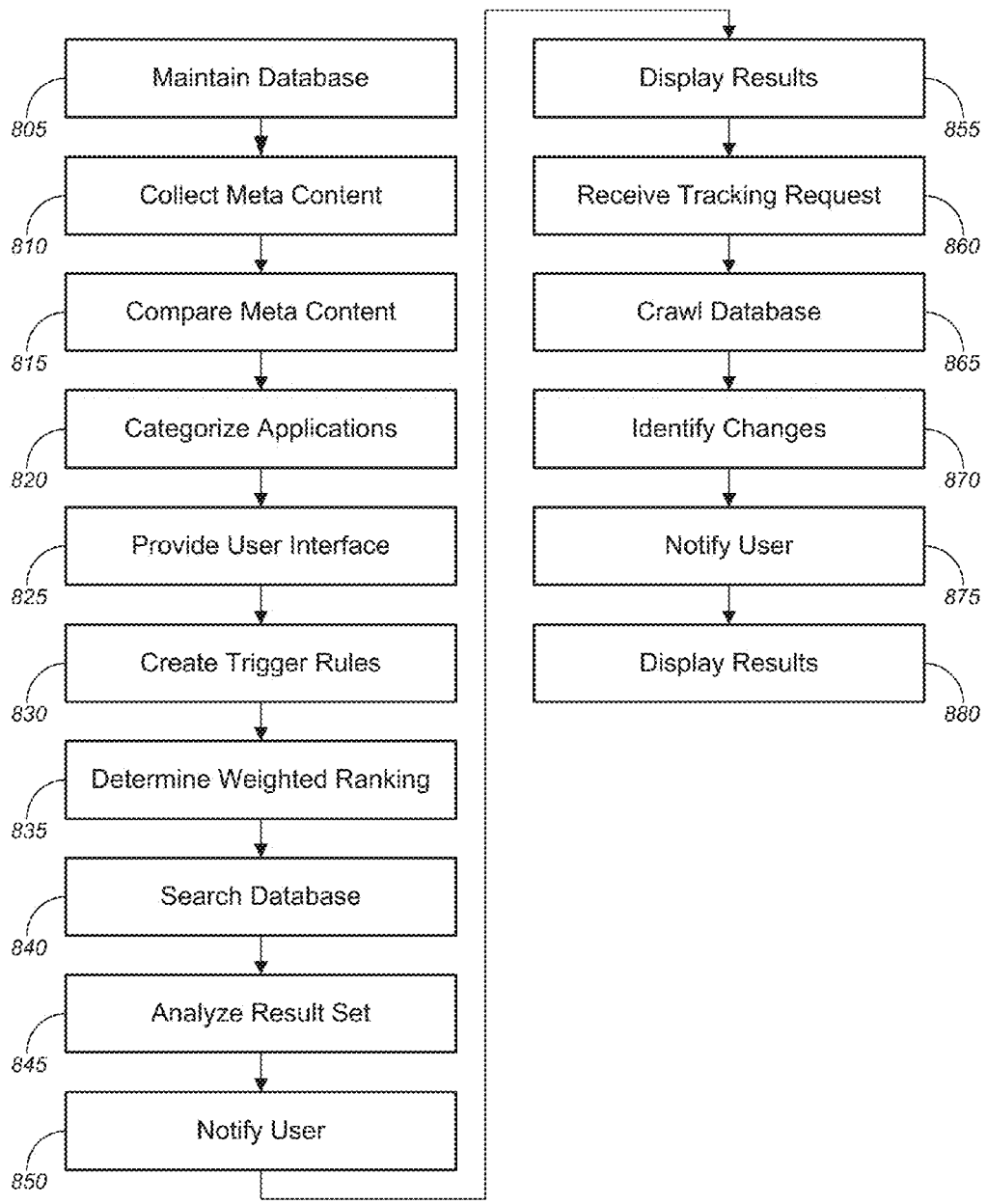
FIG. 8 is a process flow diagram illustrating a method of tracking software applications, in accordance with one set of embodiments.

Returning to FIG. 8, in some cases, once meta-content has been collected (e.g., from the app store, from the application itself, and/or from other content referenced by the application), the method 800 might further comprise comparing the current meta-content about the plurality of software applications with existing meta-content in the database (block 815). At block 820, the method 800 can include categorizing each of the plurality of software applications the database, based on a comparison of the current metadata with the existing metadata. Such a comparison can include identifying relationships and/or associations between applications (including applications that do not appear to have any developers or distributors in common), based on matches in the meta-content of the applications.

The method 800 can include providing a user interface for interacting with the user (block 825). For example, the user interface can be used to output information for a user, e.g., by displaying the information on a display device, printing information with a printer, playing audio through a speaker, etc.; the user interface can also function to receive input from a user, e.g., using standard input devices such as mice and other pointing devices, motion capture devices, touchpads and/or touchscreens, keyboards (e.g., numeric and/or alphabetic), microphones, etc. The procedures undertaken to provide a user interface, therefore, can vary depending on the nature of the implementation; in some cases, providing a user interface can comprise displaying the user interface on a display device; in other cases, however, in which the user interface is displayed on a device remote from the computer system (such as on a client computer, wireless device, etc.), providing the user interface might comprise formatting data for transmission to such a device and/or transmitting, receiving and/or interpreting data that is used to create the user interface on the remote device. Alternatively and/or additionally, the user interface on a client computer (or any other appropriate user device) might be a web interface, in which the user interface is provided through one or more web pages that are served from a computer system (and/or a web server in communication with the computer system), and are received and displayed by a web browser on the client computer (or other capable user device). The web pages can display output from the computer system and receive input from the user (e.g., by using Web-based forms, via hyperlinks, electronic buttons, etc.). A variety of techniques can be used to create these Web pages and/or display/receive information, such as JavaScript, Java applications or applets, dynamic HTML and/or AJAX technologies, to name but a few examples.

In many cases, providing a user interface will comprise providing one or more display screens (a few examples of which are described above), each of which includes one or more user interface elements. As used herein, the term "user interface element" (also described as a "user interface mechanism" or a "user interface device") means any text, image, or device that can be displayed on a display screen for providing information to a user and/or for receiving user input. Some such elements are commonly referred to as "widgets," and can include, without limitation, text, text boxes, text fields, tables and/or grids, menus, toolbars, charts, hyperlinks, buttons, lists, combo boxes, checkboxes, radio buttons, and/or the like. While any illustrated exemplary display screens might employ specific user interface elements appropriate for the type of information to be conveyed/received by computer system in accordance with the described embodiments, it should be appreciated that the choice of user interface elements for a particular purpose is typically implementation-dependent and/or discretionary. Hence, the illustrated user interface elements employed by any display screens described herein should be considered exemplary in nature, and the reader should appreciate that other user interface elements could be substituted within the scope of various embodiments.

As noted above, in an aspect of certain embodiments, the user interface provides interaction between a user and a computer system. Hence, when this document describes procedures for displaying (or otherwise providing) information to a user, or to receiving input from a user, the user interface may be the vehicle for the exchange of such input/output. Merely by way of example, in a set of embodiments, the user interface allows the user to interact with the AppDetex system to define BrandTrackes, tracking alerts, and the like, and to view interactive reports, perform management actions, and the like.

At block 830, the method 800 might feature creating one or more trigger rules pertaining to a term of interest. As noted above, a user interface can be provided to allow the user to provide input for creating the trigger rules, and the trigger rules can include, without limitation, presence of a term of interest (e.g., a brand or trademark) in one or more fields of meta-content associated with applications on an app store. The method 800 can include further include determining, with the second computer, a weighted ranking of match conditions (block 835). In an aspect, the weighted ranking might represent a relative importance of different characteristics of the meta-content. FIG. 3 illustrates a user interface screen 300 for a user to provide input to determine the weighted rankings of various trigger rules. As shown by FIG. 3, various values can be assigned to presence of the brand in different types of meta-content, and value thresholds can be assigned to place applications in different categories. For example, as shown, the presence of a brand in an application's title might be assigned a weighting score of 1000, while an application with the brand as the application's title might be assigned a weighting score of 2500, indicating the relative importance to the user of these characteristics. The total of all of the scores can be summed and then compared to the thresholds for, e.g., critical priority, high priority, medium priority, low priority, etc., which can be defined on the same page 300. In this way, an application can be categorized based on where its combined weighting score falls within the thresholds (e.g., an application with a total weighting score of 2500 would fall within the "high priority" category in this example, while an application with a total weighting score of 1500 would fall within the "medium priority" category. It should be recognized that many different factors (including without limitation those illustrated on FIG. 3) can be considered for weighting, and any number of categories can be assigned.

At block 840, the method 800 can comprise searching the database to identify a result set comprising a plurality of records that satisfy at least one of the one or more trigger rules, and the method 800, as illustrated, includes analyzing the result set with the weighted ranking of match conditions to prioritize the plurality of records in the result set (block 845). This prioritization might categorize the records into records to be displayed or not displayed, might indicate the type of notification to be provided to the user (e.g., email notification, SMS notification, or merely updating a report in a user interface), and/or might determine ordering of records in the report.

Figure 5:
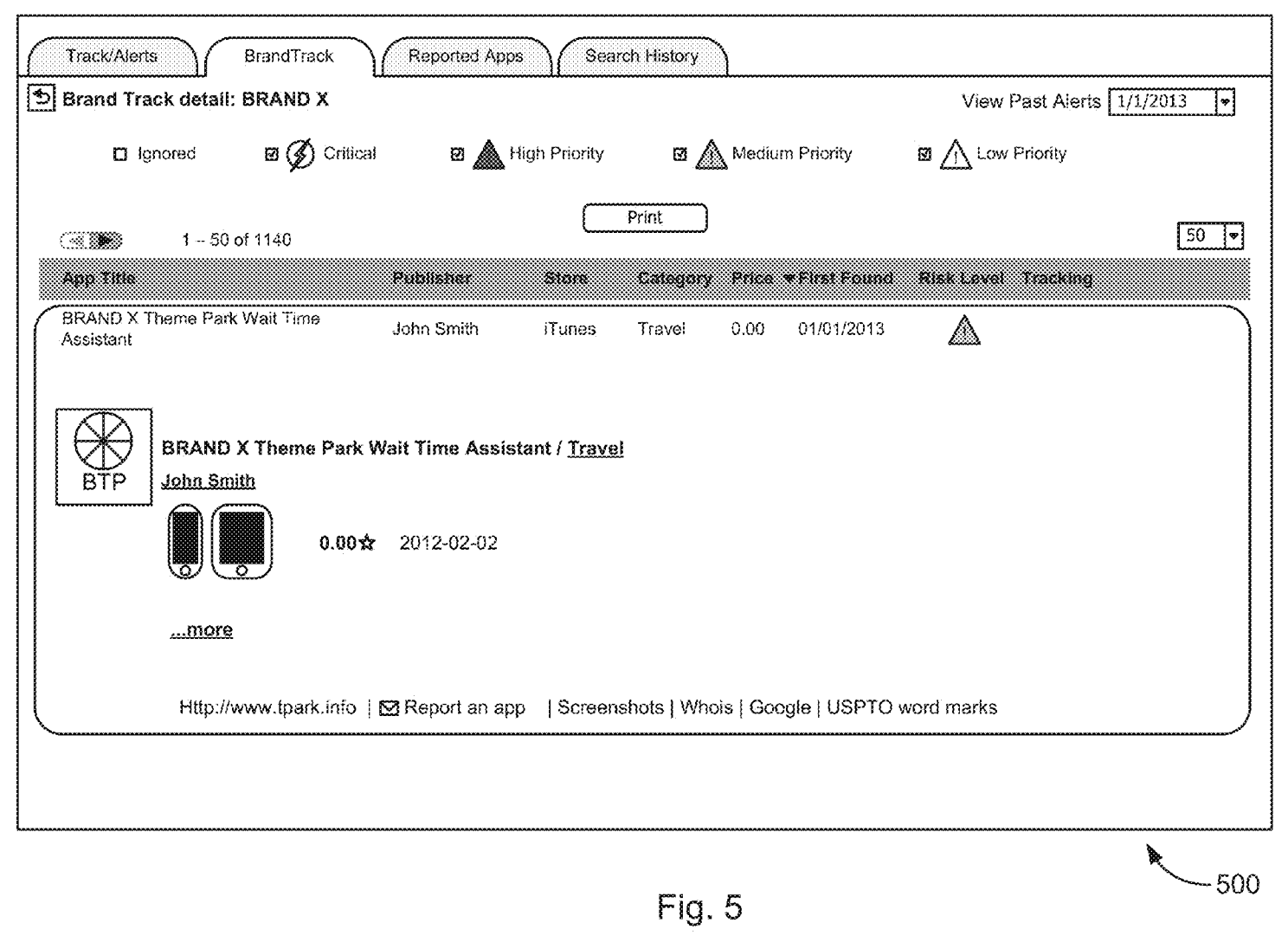

At block 850, the system might notify a user about the result set, e.g., using the techniques described above, such as by email, SMS, phone call, etc. In some cases, the method 800 can include displaying, with the user interface, at least some of the records in the result set (block 855), based at least in part on analysis of the result set with the weighted ranking. In some cases, this display can be an interactive report or a detail report, e.g., as illustrated by FIGS. 4 and 5. The display in the user interface can be considered one type of user notification, or the display might be considered a separate operation from the notification (which might be an email or SMS message with a link to the report).

The user might wish to track a particular application (or set of applications, such as all applications published by a particular publisher). Hence, at block 860, the system might receive a tracking request (for example, as described above, by a user clicking on a "Track App" or "Track Publisher" button). In response to receiving the request, the system can crawl an app store (and/or search a database) periodically (e.g., daily, weekly, etc.) to determine whether any meta-content associated with the identified application(s) has changed. If a change is identified (block 870), the system can notify a user (block 875), e.g., using any of the techniques described above and/or can display results (e.g., a summary report and/or a detail report) in a user interface (block 880), for example, as illustrated by FIGS. 4-7.

Figure 10:
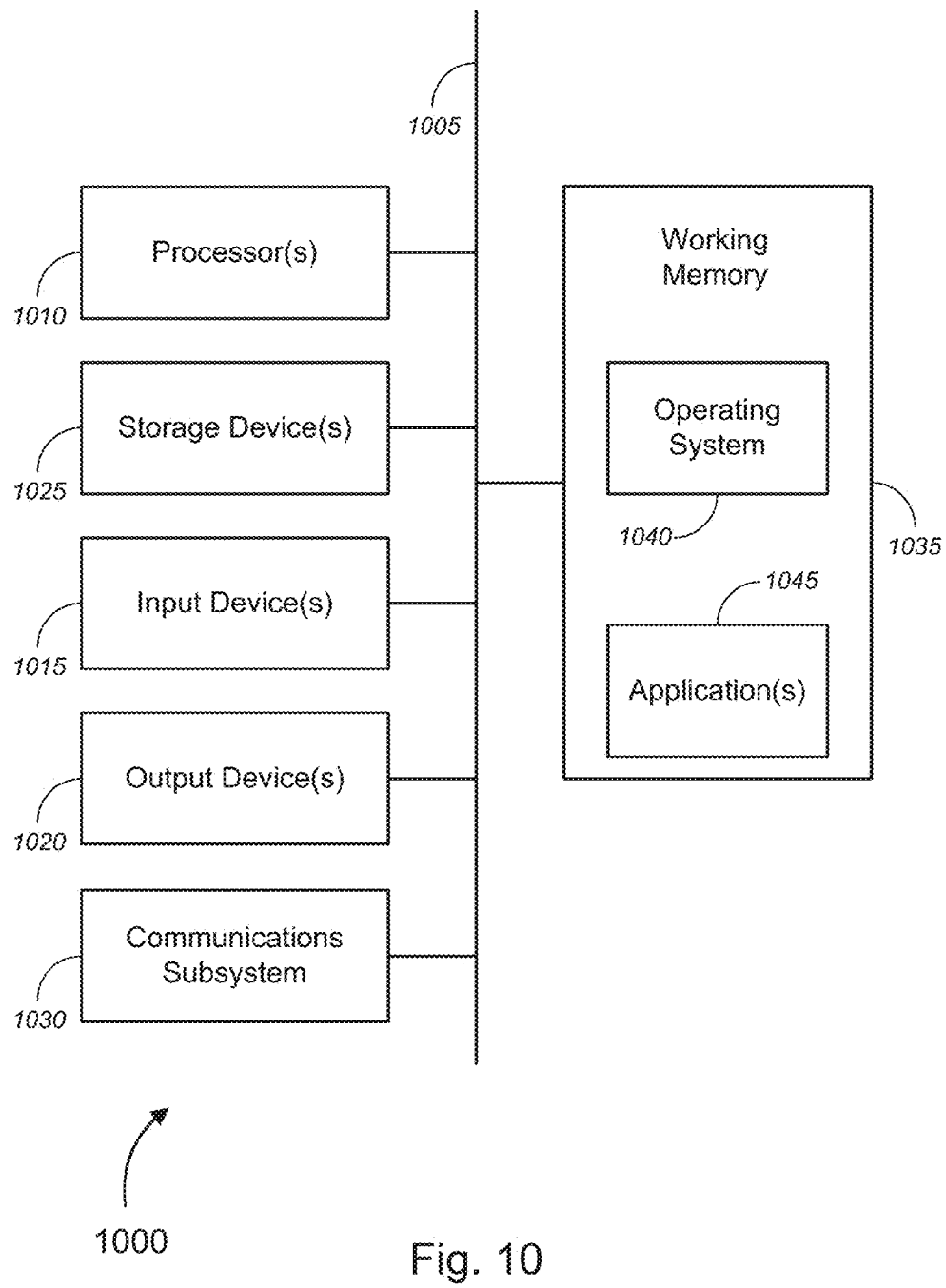
FIG. 10 is a generalized schematic diagram illustrating a computer system, in accordance with various embodiments.

FIG. 10 provides a schematic illustration of one embodiment of a computer system 1000 that can perform the methods provided by various other embodiments, as described herein, and/or can function as a server in an AppDetex system, a user client in such a system, and/or the like. It should be noted that FIG. 10 is meant only to provide a generalized illustration of various components, of which one or more (or none) of each may be utilized as appropriate. FIG. 10, therefore, broadly illustrates how individual system elements may be implemented in a relatively separated or relatively more integrated manner.

The computer system 1000 is shown comprising hardware elements that can be electrically coupled via a bus 1005 (or may otherwise be in communication, as appropriate). The hardware elements may include one or more processors 1010, including without limitation one or more general-purpose processors and/or one or more special-purpose processors (such as digital signal processing chips, graphics acceleration processors, and/or the like); one or more input devices 1015, which can include without limitation a mouse, a keyboard and/or the like; and one or more output devices 1020, which can include without limitation a display device, a printer and/or the like.

The computer system 1000 may further include (and/or be in communication with) one or more storage devices 1025, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 1000 might also include a communications subsystem 1030, which can include without limitation a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 1030 may permit data to be exchanged with a network (such as the network described below, to name one example), with other computer systems, and/or with any other devices described herein. In many embodiments, the computer system 1000 will further comprise a working memory 1035, which can include a RAM or ROM device, as described above.

The computer system 1000 also may comprise software elements, shown as being currently located within the working memory 1035, including an operating system 1040, device drivers, executable libraries, and/or other code, such as one or more application programs 1045, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 1025 described above. In some cases, the storage medium might be incorporated within a computer system, such as the system 1000. In other embodiments, the storage medium might be separate from a computer system (i.e., a removable medium, such as a compact disc, etc.), and/or provided in an installation package, such that the storage medium can be used to program, configure and/or adapt a general purpose computer with the instructions/code stored thereon. These instructions might take the form of executable code, which is executable by the computer system 1000 and/or might take the form of source and/or installable code, which, upon compilation and/or installation on the computer system 1000 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 1000) to perform methods in accordance with various embodiments of the invention. According to a set of embodiments, some or all of the procedures of such methods are performed by the computer system 1000 in response to processor 1010 executing one or more sequences of one or more instructions (which might be incorporated into the operating system 1040 and/or other code, such as an application program 1045) contained in the working memory 1035. Such instructions may be read into the working memory 1035 from another computer readable medium, such as one or more of the storage device(s) 1025. Merely by way of example, execution of the sequences of instructions contained in the working memory 1035 might cause the processor(s) 1010 to perform one or more procedures of the methods described herein.

The terms "machine readable medium" and "computer readable medium," as used herein, refer to any medium that participates in providing data that causes a machine to operation in a specific fashion. In an embodiment implemented using the computer system 1000, various computer readable media might be involved in providing instructions/code to processor(s) 1010 for execution and/or might be used to store and/or carry such instructions/code (e.g., as signals). In many implementations, a computer readable medium is a non-transitory, physical and/or tangible storage medium. Such a medium may take many forms, including but not limited to, non-volatile media, volatile media, and transmission media. Non-volatile media includes, for example, optical and/or magnetic disks, such as the storage device(s) 1025. Volatile media includes, without limitation, dynamic memory, such as the working memory 1035. Transmission media includes, without limitation, coaxial cables, copper wire and fiber optics, including the wires that comprise the bus 1005, as well as the various components of the communication subsystem 1030 (and/or the media by which the communications subsystem 1030 provides communication with other devices). Hence, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 1010 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1000. These signals, which might be in the form of electromagnetic signals, acoustic signals, optical signals and/or the like, are all examples of carrier waves on which instructions can be encoded, in accordance with various embodiments of the invention.

The communications subsystem 1030 (and/or components thereof) generally will receive the signals, and the bus 1005 then might carry the signals (and/or the data, instructions, etc. carried by the signals) to the working memory 1035, from which the processor(s) 1005 retrieves and executes the instructions. The instructions received by the working memory 1035 may optionally be stored on a storage device 1025 either before or after execution by the processor(s) 1010.

Figure 11:
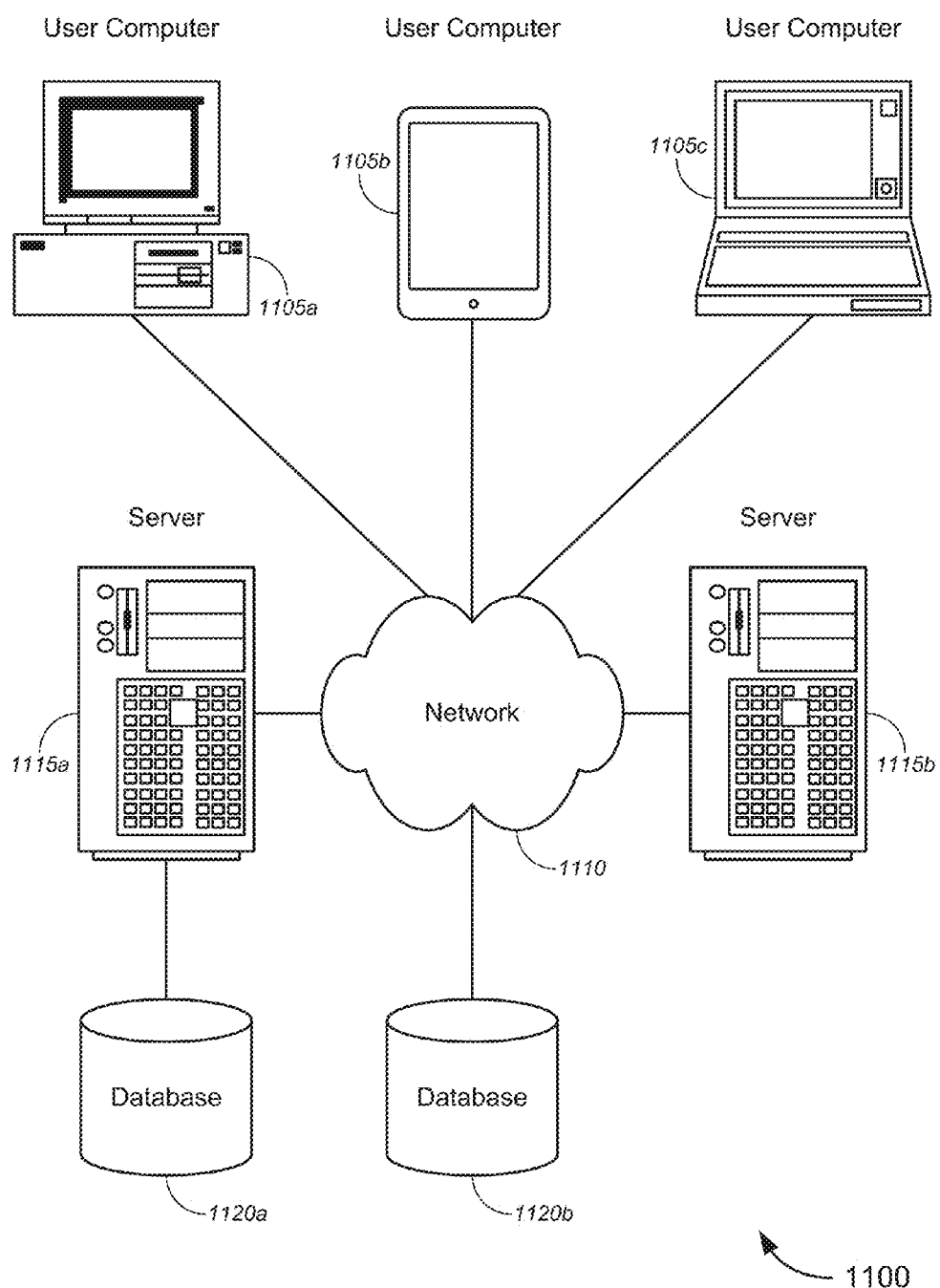
FIG. 11 is a block diagram illustrating a networked system of computers, which can be used in accordance with various embodiments.

FIG. 11 illustrates a schematic diagram of a networked computer system 1100 that can be used to provide AppDetex system functionality in accordance with one set of embodiments. The system 1100 can include one or more user computers 1105. A user computer 1105 can be a general purpose personal computer (including, merely by way of example, desktop computers, tablet computers, laptop computers, handheld computers, and the like, running any appropriate operating system, several of which are available from vendors such as Apple, Microsoft Corp., and the like) and/or a workstation computer running any of a variety of commercially-available UNIX™ or UNIX-like operating systems. A user computer 1105 can also have any of a variety of applications, including one or more applications configured to perform methods provided by various embodiments (as described above, for example), as well as one or more office applications, database client and/or server applications, and/or web browser applications. Alternatively, a user computer 1105 can be any other electronic device, such as a thin-client computer, Internet-enabled mobile telephone, and/or personal digital assistant, capable of communicating via a network (e.g., the network 1110 described below) and/or of displaying and navigating web pages or other types of electronic documents. Although the exemplary system 1100 is shown with three user computers 1105, any number of user computers can be supported.

Certain embodiments operate in a networked environment, which can include a network 1110. The network 1110 can be any type of network familiar to those skilled in the art that can support data communications using any of a variety of commercially-available (and/or free or proprietary) protocols, including without limitation TCP/IP, SNA™, IPX™, Apple-Talk™, and the like. Merely by way of example, the network 1110 can include a local area network ("LAN"), including without limitation a fiber network, an Ethernet network, a Token-Ring™ network and/or the like; a wide-area network; a wireless wide area network ("WWAN"); a virtual network, such as a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments can also include one or more server computers 1115. Each of the server computers 1115 may be configured with an operating system, including without limitation any of those discussed above, as well as any commercially (or freely) available server operating systems. Each of the servers 1115 may also be running one or more applications, which can be configured to provide services to one or more clients 1105 and/or other servers 1115.

Merely by way of example, one of the servers 1115 may be a web server, which can be used, merely by way of example, to process requests for web pages or other electronic documents from user computers 1105. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 1105 to perform methods of the invention.

The server computers 1115, in some embodiments, might include one or more application servers, which can be configured with one or more applications accessible by a client running on one or more of the client computers 1105 and/or other servers 1115. Merely by way of example, the server(s) 1115 can be one or more general purpose computers capable of executing programs or scripts in response to the user computers 1105 and/or other servers 1115, including without limitation web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including without limitation those commercially available from Oracle™, Microsoft™, Sybase™, IBM™ and the like, which can process requests from clients (including, depending on the configuration, dedicated database clients, API clients, web browsers, etc.) running on a user computer 1105 and/or another server 1115. In some embodiments, an application server can create web pages dynamically for displaying the information in accordance with various embodiments, such the interface described above and illustrated by FIGS. 1-7. Data provided by an application server may be formatted as one or more web pages (comprising HTML, JavaScript, etc., for example) and/or may be forwarded to a user computer 1105 via a web server (as described above, for example). Similarly, a web server might receive web page requests and/or input data from a user computer 1105 and/or forward the web page requests and/or input data to an application server. In some cases a web server may be integrated with an application server.

In accordance with further embodiments, one or more servers 1115 can function as a file server and/or can include one or more of the files (e.g., application code, data files, etc.) necessary to implement various disclosed methods, incorporated by an application running on a user computer 1105 and/or another server 1115. Alternatively, as those skilled in the art will appreciate, a file server can include all necessary files, allowing such an application to be invoked remotely by a user computer 1105 and/or server 1115.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 1120. The location of the database(s) 1120 is discretionary: merely by way of example, a database 1120a might reside on a storage medium local to (and/or resident in) a server 1115a (and/or a user computer 1105). Alternatively, a database 1120b can be remote from any or all of the computers 1105, 1115, so long as it can be in communication (e.g., via the network 1110) with one or more of these. In a particular set of embodiments, a database 1120 can reside in a storage-area network ("SAN") familiar to those skilled in the art. (Likewise, any necessary files for performing the functions attributed to the computers 1105, 1115 can be stored locally on the respective computer and/or remotely, as appropriate.) In one set of embodiments, the database 1120 can be a relational database, such as an Oracle database, that is adapted to store, update, and retrieve data in response to SQL-formatted commands. The database might be controlled and/or maintained by a database server, as described above, for example.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
    maintaining a database comprising existing meta-content about one or more software applications, the database comprising a plurality of records, including a record for each of the one or more software applications;
    analyzing, with a first computer, a software application to collect meta-content about the software application, by executing the software application, decompiling the software application, and collecting meta-content from the executed software application and the decompiled software application;
    storing the meta-content about the software application in the database;
    creating, with a second computer, one or more trigger rules pertaining to a term of interest;
    determining, with the second computer, weighting factors for one or more of the trigger rules, the weighting factors comprising a weighted ranking representing a relative importance of different characteristics of the meta-content;
    searching the database with the second computer to identify a result set comprising one or more records that satisfy at least one of the one or more trigger rules;
    analyzing, with the second computer, the result set with the weighting factors to prioritize the plurality of records in the result set, based at least in part on identifying the term of interest in at least one of one or more of a text string or an image obtained from the executed software application, one or more of a text string or an image obtained from the decompiled software application, or meta-content about the software application;
    notifying a user about the result set;
    providing, with the second computer, a user interface for interacting with the user; and
    displaying, with the user interface, at least some of the records in the result set, based at least in part on analysis of the result set with the weighted ranking;
    receiving, with the user interface, user input indicating to track a particular publisher of the software application;
    identifying, with one of the first computer or the second computer, all software applications associated with the particular publisher;
    analyzing, with the first computer and on one of a predetermined frequency or a selected frequency, each of the software applications associated with the particular publisher to collect meta-content about each of the software applications, by executing each of the software applications, decompiling each of the software applications, and collecting meta-content from each of the software applications;
    storing the meta-content about each of the software applications in the database;
    searching each of the software applications in the database with the second computer to identify a second result set comprising one or more second records that satisfy at least one of the one or more trigger rules;
    analyzing, with the second computer, the second result set with the weighting factors to prioritize the plurality of records in the second result set, based at least in part on search of the term of interest in at least one of one or more of a text string or an image obtained from each executed software application associated with the particular publisher, one or more of a text string or an image obtained from each decompiled software application associated with the particular publisher, or meta-content about each of the software applications associated with the particular publisher;
    notifying the user about the second result set; and
    displaying, with the user interface, at least some of the second records in the second result set, based at least in part on analysis of the second result set with the weighted ranking.

2. The method of claim 1, wherein the meta-content includes a portion of content of the application.

3. The method of claim 1, further comprising:
automatically downloading, with the first computer, the software application from an app store.

4. The method of claim 1, wherein analyzing the software application comprises decompiling the software application.

5. The method of claim 1, wherein the meta-content comprises one or more text strings within the application.

6. The method of claim 5, wherein the one or more text strings comprise one or more Internet host names.

7. The method of claim 5, wherein the one or more text strings comprise one or more Internet Protocol ("IP") addresses.

8. The method of claim 5, wherein the one or more text strings comprise at least one text string from an application database used by the application.

9. The method of claim 5, wherein the one or more text strings are found within decompiled code of the application.

10. The method of claim 5, wherein the one or more text strings comprise one or more trademarks.

11. The method of claim 5, wherein the one or more text strings comprise copyrighted content.

12. The method of claim 5, wherein the one or more text strings comprise one or more uniform resource locators ("URLs").

13. The method of claim 12, further comprising:
obtaining, with the first computer, WHOIS information associated with a domain referenced by the URL.

14. The method of claim 13, further comprising:
navigating, with the first computer, to a web site referenced by the URL, and wherein the meta-content comprises content from the web site referenced by the URL.

15. The method of claim 14, wherein the website referenced by the URL references a second web site, wherein the method further comprises navigating, with the second computer, to the second website, and wherein the meta-content further comprises content from the second web site.

16. The method of claim 5, wherein the one or more text strings comprise one or more electronic mail addresses.

17. The method of claim 5, wherein the one or more text strings comprise one or more top-level domains ("TLD").

18. The method of claim 1, further comprising:
comparing the meta-content about the software application with existing meta-content in the database; and
categorizing the software application in the database, based on a comparison of the current metadata with the existing metadata.

19. The method of claim 18, wherein categorizing the software application comprises associating the software application with one or more other software applications in the database.

20. The method of claim 1, further comprising:
providing a search interface for a user to search the database, including the meta-content about the software application, for a term of interest.

21. The method of claim 1, further comprising:
crawling, with the first computer, an app store to collect meta-content about one or more software applications; and
identifying the software application based on the meta-content collected by crawling the app store.

22. The method of claim 1, wherein the first computer and the second computer are the same computer.

23. An apparatus, comprising:
one or more non-transitory computer readable media collectively having encoded thereon a set of instructions executable by one or more computers to perform one or more operations, the set of instructions comprising:
instructions to maintain a database comprising existing meta-content about one or more software applications, the database comprising a plurality of records, including a record for each of the one or more software applications;
instructions to analyze a software application to collect meta-content about the software application, by executing the software application, decompiling the software application, and collecting meta-content from the executed software application and the decompiled software application;
instructions to store the meta-content about the software application in the database;
instructions to create one or more trigger rules pertaining to a term of interest;
instructions to determine weighting factors for one or more of the trigger rules, the weighting factors comprising a weighted ranking representing a relative importance of different characteristics of the meta-content;
instructions to search the database to identify a result set comprising one or more records that satisfy at least one of the one or more trigger rules;
instructions to analyze the result set with the weighting factors to prioritize the plurality of records in the result set, based at least in part on identifying the term of interest in at least one of one or more of a text string or an image obtained from the executed software application, one or more of a text string or an image obtained from the decompiled software application, or meta-content about the software application;
instructions to notify a user about the result set;
instructions to provide a user interface for interacting with the user; and
instructions to display at least some of the records in the result set, based at least in part on analysis of the result set with the weighted ranking;
instructions to receive, with the user interface, user input indicating to track a particular publisher of the software application;
instructions to identify all software applications associated with the particular publisher;
instructions to analyze, on one of a predetermined frequency or a selected frequency, each of the software applications associated with the particular publisher to collect meta-content about each of the software applications, by executing each of the software applications, decompiling each of the software applications, and collecting meta-content from each of the software applications;
instructions to store the meta-content about each of the software applications in the database;
instructions to search each of the software applications in the database with the second computer to identify a second result set comprising one or more second records that satisfy at least one of the one or more trigger rules;
instructions to analyze the second result set with the weighting factors to prioritize the plurality of records in the second result set, based at least in part on search of the term of interest in at least one of one or more of a text string or an image obtained from each executed software application associated with the particular publisher, one or more of a text string or an image obtained from each decompiled software application associated with the particular publisher, or meta-content about each of the software applications associated with the particular publisher;
  instructions to notify the user about the second result set; and
  instructions to display, with the user interface, at least some of the second records in the second result set, based at least in part on analysis of the second result set with the weighted ranking.

24. A computer system, comprising:
one or more processors; and
one or more non-transitory computer readable media in communication with the one or more processors, the one or more computer readable media collectively having encoded thereon a set of instructions executable by the computer system to perform one or more operations, the set of instructions comprising:
  instructions to maintain a database comprising existing meta-content about one or more software applications, the database comprising a plurality of records, including a record for each of the one or more software applications;
  instructions to analyze a software application to collect meta-content about the software application, by executing the software application, decompiling the software application, and collecting meta-content from the executed software application and the decompiled software application;
  instructions to store the meta-content about the software application in the database;
  instructions to create one or more trigger rules pertaining to a term of interest;
  instructions to determine weighting factors for one or more of the trigger rules, the weighting factors comprising a weighted ranking representing a relative importance of different characteristics of the meta-content;
  instructions to search the database to identify a result set comprising one or more records that satisfy at least one of the one or more trigger rules;
  instructions to analyze the result set with the weighting factors to prioritize the plurality of records in the result set, based at least in part on identifying the term of interest in at least one of one or more of a text string or an image obtained from the executed software application, one or more of a text string or an image obtained from the decompiled software application, or meta-content about the software application;
  instructions to notify a user about the result set;
  instructions to provide a user interface for interacting with the user; and
  instructions to display at least some of the records in the result set, based at least in part on analysis of the result set with the weighted ranking;
  instructions to receive, with the user interface, user input indicating to track a particular publisher of the software application;
  instructions to identify all software applications associated with the particular publisher;
  instructions to analyze, on one of a predetermined frequency or a selected frequency, each of the software applications associated with the particular publisher to collect meta-content about each of the software applications, by executing each of the software applications, decompiling each of the software applications, and collecting meta-content from each of the software applications;
  instructions to store the meta-content about each of the software applications in the database;
  instructions to search each of the software applications in the database with the second computer to identify a second result set comprising one or more second records that satisfy at least one of the one or more trigger rules;
  instructions to analyze the second result set with the weighting factors to prioritize the plurality of records in the second result set, based at least in part on search of the term of interest in at least one of one or more of a text string or an image obtained from each executed software application associated with the particular publisher, one or more of a text string or an image obtained from each decompiled software application associated with the particular publisher, or meta-content about each of the software applications associated with the particular publisher;
  instructions to notify the user about the second result set; and
  instructions to display, with the user interface, at least some of the second records in the second result set, based at least in part on analysis of the second result set with the weighted ranking.

\* \* \* \* \*